US012598518B2

(12) United States Patent
Gao et al.

(10) Patent No.: US 12,598,518 B2
(45) Date of Patent: Apr. 7, 2026

(54) CELL RE-SELECTION METHOD, TERMINAL, AND COMPUTER-READABLE STORAGE MEDIUM

(71) Applicant: ZTE CORPORATION, Shenzhen (CN)

(72) Inventors: Minggang Gao, Shenzhen (CN); Qingyu Ni, Shenzhen (CN); Wei Xiang, Shenzhen (CN); Xuemei Ding, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 348 days.

(21) Appl. No.: 18/249,620

(22) PCT Filed: Jun. 18, 2021

(86) PCT No.: PCT/CN2021/100801
§ 371 (c)(1),
(2) Date: Apr. 19, 2023

(87) PCT Pub. No.: WO2022/088693
PCT Pub. Date: May 5, 2022

(65) Prior Publication Data
US 2023/0388868 A1      Nov. 30, 2023

(30) Foreign Application Priority Data

Oct. 29, 2020   (CN) .......................... 202011181482.7

(51) Int. Cl.
*H04W 36/00*      (2009.01)
*H04W 36/08*      (2009.01)
*H04W 48/08*      (2009.01)

(52) U.S. Cl.
CPC ... *H04W 36/0027* (2013.01); *H04W 36/0077* (2013.01); *H04W 36/08* (2013.01); *H04W 48/08* (2013.01)

(58) Field of Classification Search
CPC ......... H04W 36/0027; H04W 36/0077; H04W 36/08; H04W 48/08; H04W 48/20; H04W 8/183; H04W 88/06; H04W 76/19
See application file for complete search history.

(56) References Cited

U.S. PATENT DOCUMENTS

2012/0149372 A1      6/2012   Lee
2016/0353516 A1      12/2016   Rajurkar et al.
(Continued)

FOREIGN PATENT DOCUMENTS

CN      111727618 A      9/2020
CN      111727629 A      9/2020
(Continued)

OTHER PUBLICATIONS

European Patent Office. Extended European Search Report for EP Application No. 21884434.8, mailed Apr. 4, 2024, pp. 1-9.
(Continued)

*Primary Examiner* — Khoa Huynh
(74) *Attorney, Agent, or Firm* — Vivacqua Crane, PLLC

(57) ABSTRACT

Disclosed are a cell reselection method, a terminal device and a computer-readable storage medium. The cell reselection method, applied to a terminal device, may include: acquiring base station parameter information of a second base station in response to the first USIM card being subjected to cell reselection and changing from the first base station to the second base station by means of reselection; and performing cell reselection on the second USIM card according to the base station parameter information.

6 Claims, 6 Drawing Sheets

(56) References Cited

U.S. PATENT DOCUMENTS

2017/0127305 A1      5/2017  Dev et al.
2023/0189379 A1*    6/2023  Hong ................... H04W 76/20
                                                        370/329

FOREIGN PATENT DOCUMENTS

WO        2016191000 A1    12/2016
WO        2018044618 A1     3/2018

OTHER PUBLICATIONS

International Searching Authority. International Search Report and
Written Opinion for PCT Application No. PCT/CN2021/100801
and English translation, mailed Aug. 30, 2021, pp. 1-10.

* cited by examiner

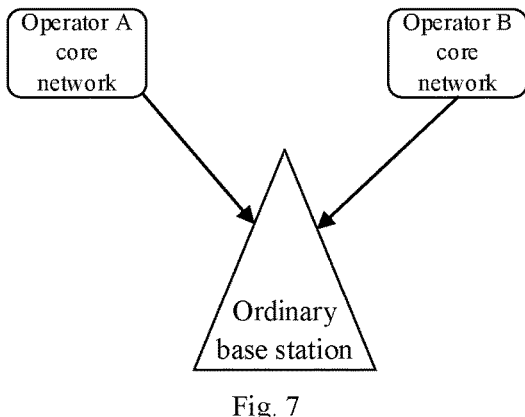

Fig. 7

Register the second USIM card to the second base station according to the base station parameter information     S410

Fig. 8

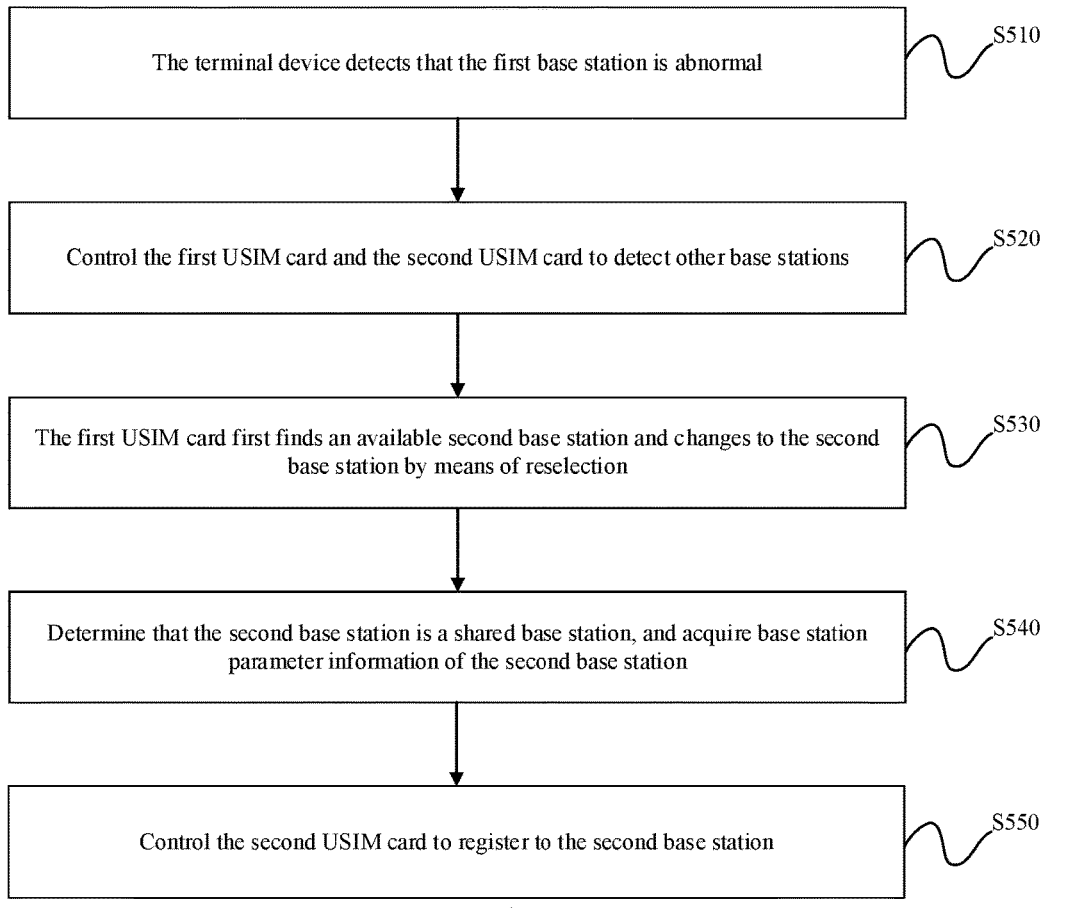

The terminal device detects that the first base station is abnormal     S510

Control the first USIM card and the second USIM card to detect other base stations     S520

The first USIM card first finds an available second base station and changes to the second base station by means of reselection     S530

Determine that the second base station is a shared base station, and acquire base station parameter information of the second base station     S540

Control the second USIM card to register to the second base station     S550

Fig. 9

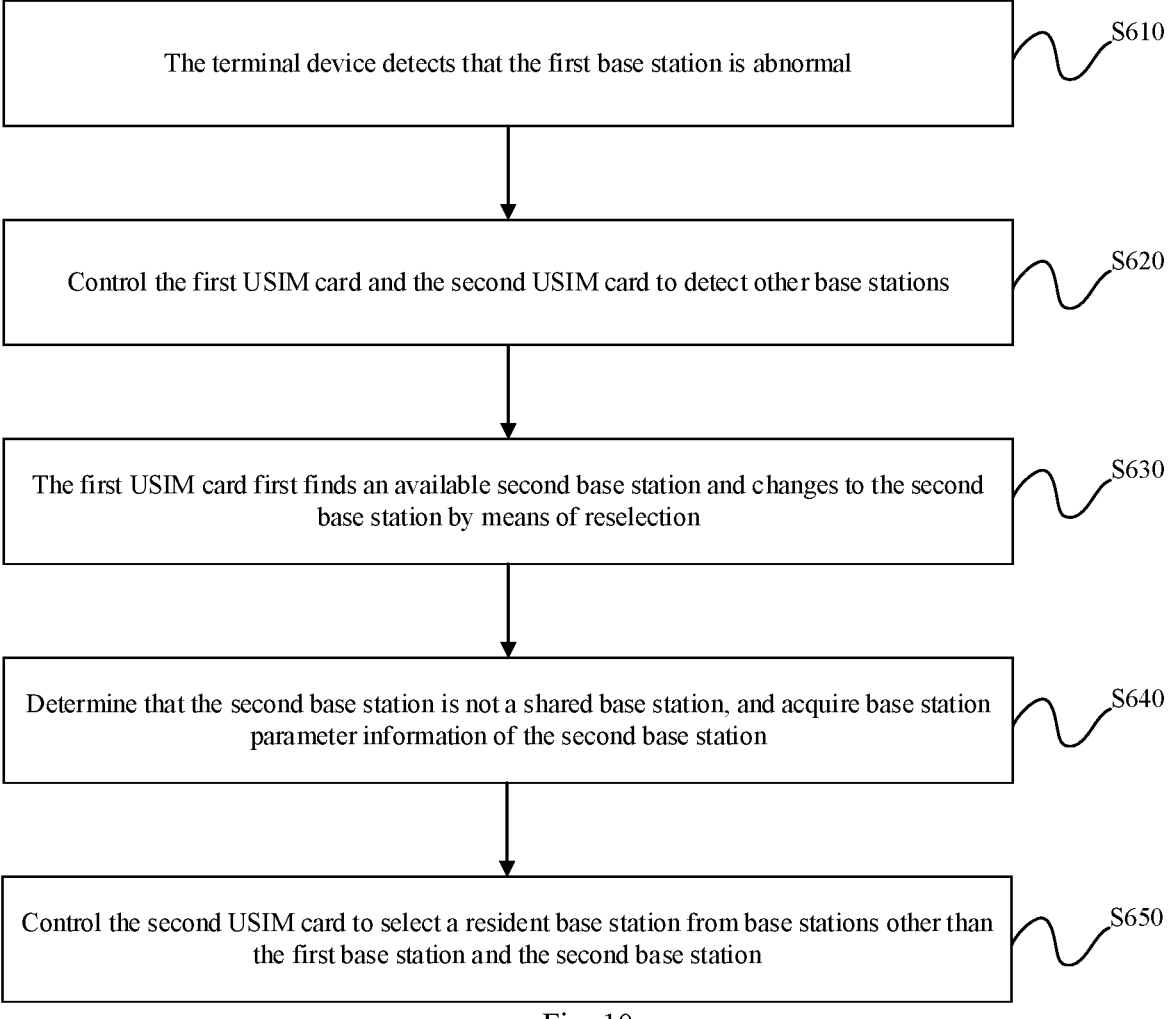

The terminal device detects that the first base station is abnormal          S610

Control the first USIM card and the second USIM card to detect other base stations          S620

The first USIM card first finds an available second base station and changes to the second base station by means of reselection          S630

Determine that the second base station is not a shared base station, and acquire base station parameter information of the second base station          S640

Control the second USIM card to select a resident base station from base stations other than the first base station and the second base station          S650

Fig. 10

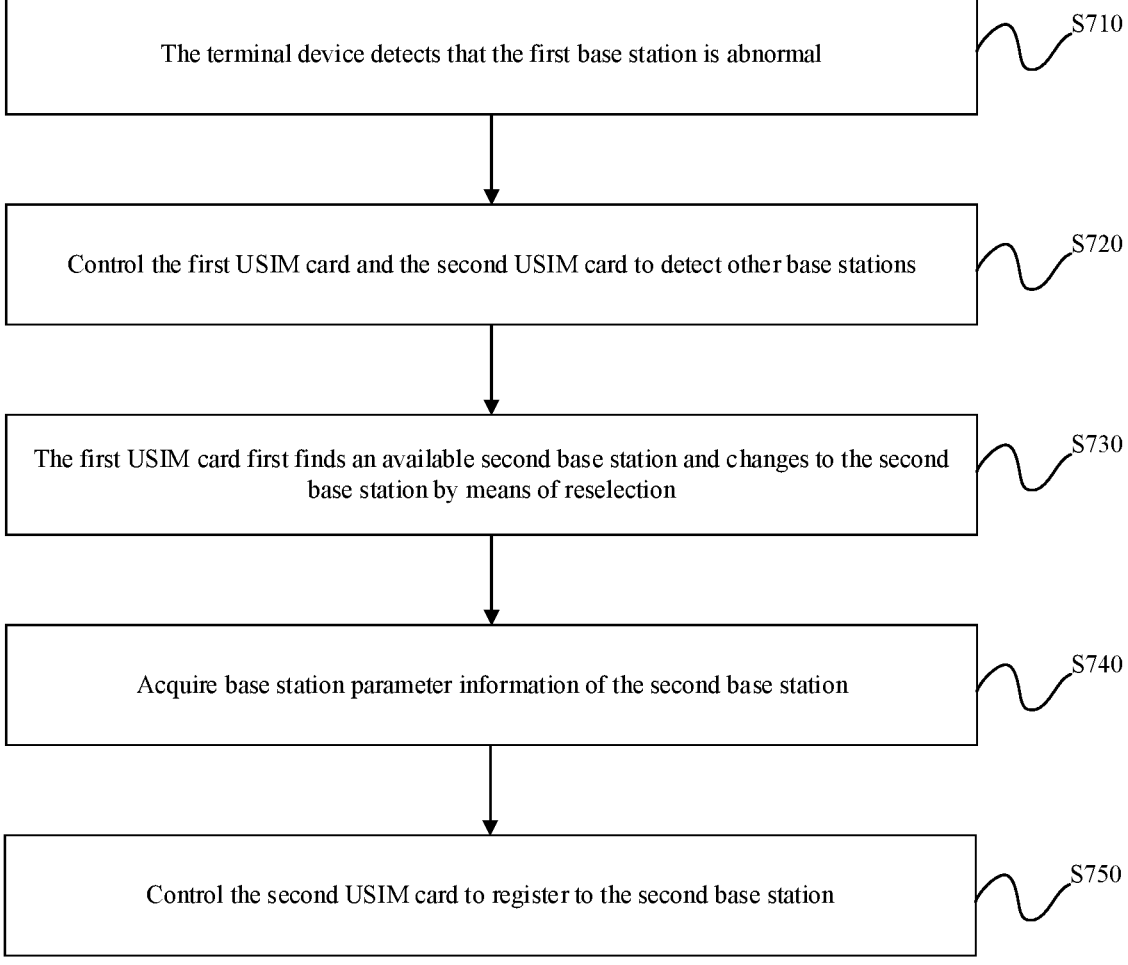

The terminal device detects that the first base station is abnormal — S710

Control the first USIM card and the second USIM card to detect other base stations — S720

The first USIM card first finds an available second base station and changes to the second base station by means of reselection — S730

Acquire base station parameter information of the second base station — S740

Control the second USIM card to register to the second base station — S750

Fig. 11

CELL RE-SELECTION METHOD, TERMINAL, AND COMPUTER-READABLE STORAGE MEDIUM

CROSS-REFERENCE TO RELATED APPLICATION

This application is a national stage filing under 35 U.S.C. § 371 of international application number PCT/CN2021/100801, filed Jun. 18, 2021, which claims priority to Chinese patent application No. 202011181482.7, filed Oct. 29, 2020. The contents of these applications are incorporated herein by reference in their entirety.

TECHNICAL FIELD

The present disclosure relates to the technical field of wireless communication, and more particularly, to a cell reselection method, a terminal device and a computer-readable storage medium.

BACKGROUND

In a wireless communication system, a base station provides services to a terminal device, and wireless communication is enabled between the base station and the terminal device through electromagnetic waves. Through the base station, the wireless communication system can provide wireless coverage for terminal devices within a certain geographical range which is called a cell. Due to communication service quality error and other reasons, the terminal device occasionally may need to reselect cells. In some cases, the reselection behavior of the terminal device is usually controlled by enhancing the signal strength or increasing a certain threshold or offset.

In some cases, for a multi-card terminal device, such as a dual-card terminal device, there may be cases where two mobile phone cards belong to the same operator and are registered to the same base station, or there may be cases where two mobile phone cards belong to different operators and are registered to the same shared base station. When the currently used mobile phone card may need to reselect a cell due to the abnormality of the currently connected base station, the standby mobile phone card may also need to reselect a cell. Because the two mobile phone cards can each be subjected to cell reselection and interact with the base station, network resources are occupied.

SUMMARY

The following is an overview of the subject described in detail herein. This overview is not intended to limit the scope of protection of the claims.

The present disclosure aims to address, at least to a certain extent, one of the related technical problems. Therefore, the present disclosure proposes a cell reselection method, a terminal device and a computer-readable storage medium.

In accordance with a first aspect of the present disclosure, an embodiment provides a cell reselection method, which is applied to a terminal device, a first Universal Subscriber Identity Module (USIM) card and a second USIM card are installed in the terminal device and are registered to a first base station. The method may include: acquiring base station parameter information of a second base station in response to the first USIM card being subjected to cell reselection and changing from the first base station to the second base station by means of reselection; and performing cell reselection on the second USIM card according to the base station parameter information.

In accordance with a second aspect of the present disclosure, an embodiment provides a terminal device, a first USIM card and a second USIM card are installed in the terminal device and are registered to a first base station. The terminal device may include: a parameter acquisition module configured to acquire base station parameter information of a second base station in response to the first USIM card being subjected to cell reselection and changing from the first base station to the second base station by means of reselection; and a cell reselection module configured to perform cell reselection on the second USIM card according to the base station parameter information.

In accordance with a third aspect of the present disclosure, an embodiment provides a terminal device. The terminal device may include: a memory, a processor, and a computer program stored in the memory and executable by the processor which, when executed by the processor, causes the processor to perform the cell reselection method described in the first aspect.

In accordance with a fourth aspect of the present disclosure, an embodiment provides a computer-readable storage medium storing a computer-executable instruction which, when executed by a processor, causes the processor to perform the cell reselection method described in the first aspect.

Other features and advantages of the present disclosure will be set forth in the following description, and partly become apparent from the description, or understood by implementing the present disclosure. The objects and other advantages of the present disclosure can be realized and obtained by the structure particularly pointed out in the description, claims, and accompanying drawings.

BRIEF DESCRIPTION OF DRAWINGS

FIG. 7 is a schematic scenario diagram of a network architecture provided by an embodiment of the present disclosure;

FIG. 8 is a flowchart of a reselection method when a first USIM card and a second USIM card belong to the same operator, provided by an embodiment of the present disclosure;

FIG. 9 is a flowchart of a cell reselection method provided by an example of the present disclosure;

FIG. 10 is a flowchart of a cell reselection method provided by another example of the present disclosure;

FIG. 11 is a flowchart of a cell reselection method provided by another example of the present disclosure;

DETAILED DESCRIPTION

In order to make the objects, technical schemes and advantages of the present disclosure clear, the present disclosure will be further described in detail in conjunction with the drawings and embodiments. It should be understood that the specific embodiments described here are only used to illustrate the present disclosure, and are not intended to limit the present disclosure.

It is to be noted, although functional modules have been divided in the schematic diagrams of apparatuses and logical orders have been shown in the flowcharts, in some cases, the modules may be divided in a different manner, or the steps shown or described may be executed in an order different from the orders as shown in the flowcharts. The terms such as "first", "second" and the like in the description, the claims, and the accompanying drawings are used to distinguish similar objects, and are not necessarily used to describe a specific sequence or a precedence order.

The present disclosure provides a cell reselection method, a terminal device and a computer-readable storage medium. A first Universal Subscriber Identity Module (USIM) card and a second USIM card are installed in the terminal device and are registered to a first base station. The terminal device acquires base station parameter information of a second base station in a case where the first USIM card is subjected to cell reselection to be reselected from the first base station to the second base station, the base station parameter information including one or more of a minimum receiving level of a target base station, an offset between the target base station and an original base station, a hysteresis value of cell reselection and a priority of the target base station. Cell reselection performed on the second USIM card is completed according to the base station parameter information of the second base station, that is, the base station parameter information of the reselected base station obtained by performing cell reselection on the first USIM card is provided as a data reference for cell reselection performed on the second USIM card. Therefore, the time consumed for performing cell reselection on the second USIM card can be shortened, and the occupation of network resources caused by the cell search by the second USIM card can be avoided.

The embodiments of the present disclosure will be further illustrated in conjunction with the drawings.

Figure 1:
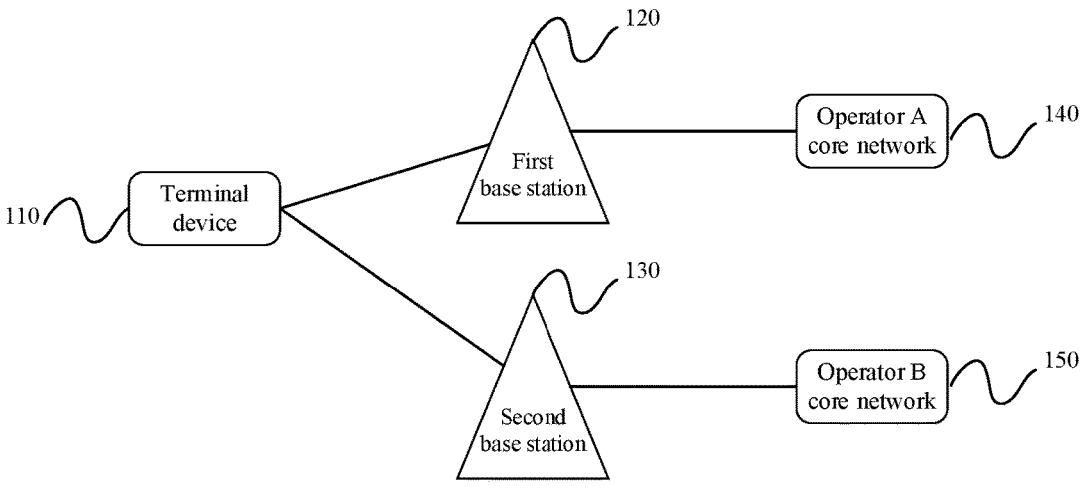
FIG. 1 is a schematic diagram of a system architecture for performing a cell reselection method provided by an embodiment of the present disclosure.

As shown in FIG. 1, FIG. 1 is a schematic diagram of a system architecture for performing a cell reselection method provided by an embodiment of the present disclosure. In an example of FIG. 1, the system architecture includes a terminal device 110, a first base station 120, a second base station 130, an operator A core network 140 and an operator B core network 150.

The terminal device 110 is configured to request wireless communication from a core network. The first base station 120 and the second base station 130 are configured to transmit data between the terminal device 110 and the operator A core network 140, and the terminal device 110 and the operator B core network 150, respectively. The operator A core network 140 and the operator B core network 150 are configured to forward requests received from respective base stations to different networks.

In an embodiment, a first USIM card and a second USIM card are installed in the terminal device 110 and are registered to the first base station 120, and data is transmitted between the terminal device 110 and the operator A core network 140 through the first base station 120. When the interaction between the terminal device 110 and the first base station 120 or between the first base station 120 and the operator A core network 140 is abnormal, the first USIM card is subjected to cell reselection and changes from the first base station 120 to the second base station 130 by means of reselection, base station parameter information of the second base station 130 is acquired, and cell reselection is performed on the second USIM card according to the base station parameter information.

The system architecture and application scenarios described in the embodiments of the present disclosure are intended to illustrate the technical schemes in the embodiments of the present disclosure clearly, and are not intended to limit the technical schemes provided by the embodiments of the present disclosure. Those having ordinary skills in the art know that, with the evolution of system architectures and the emergence of new application scenarios, the technical schemes provided by the embodiments of the present disclosure are also applicable to similar technical problems.

Those having ordinary skills in the art can understand that the structure of the system architecture shown in FIG. 1 does not constitute a limitation to the embodiments of the present disclosure and may include more or fewer components than shown, or combinations of components, or different component arrangements.

Based on the structure of the above system architecture, various embodiments of the cell reselection method of the present disclosure are proposed.

Figure 2:
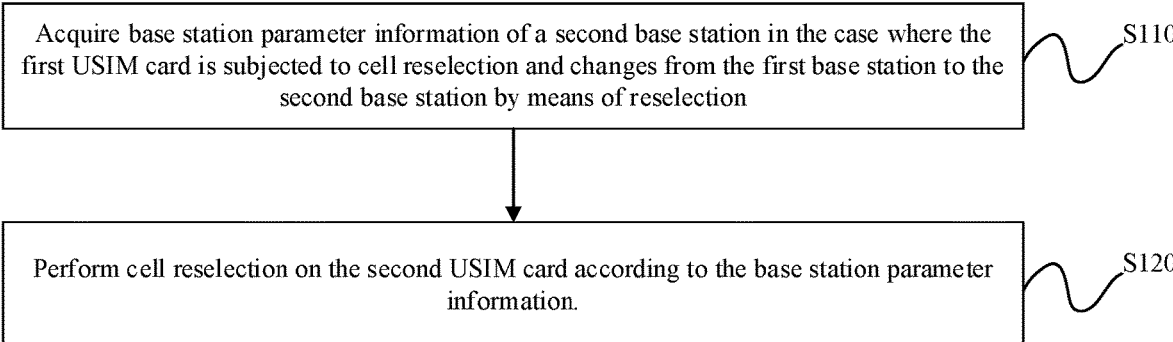
FIG. 2 is a flowchart of a cell reselection method provided by an embodiment of the present disclosure.

FIG. 2 is a flowchart of a cell reselection method provided by an embodiment of the present disclosure. In an embodiment, as shown in FIG. 2, the cell reselection method is applied to a terminal device, where a first USIM card and a second USIM card are installed in the terminal device and are registered to a first base station. The method includes, but is not limited to, following steps of S110 and S120.

At S110, base station parameter information of a second base station is acquired in the case where the first USIM card is subjected to cell reselection and changes from the first base station to the second base station by means of reselection.

At S120, cell reselection is performed on the second USIM card according to the base station parameter information.

In an embodiment, when the first USIM card is initiating a service or is conducting a service, if the first base station cannot initiate a corresponding service or a wireless quality cannot guarantee a minimum requirement threshold of the service, the first USIM card is subjected to cell reselection. When the first USIM card changes to a second base station by means of reselection, base station parameter information of the second base station is acquired, and cell reselection is performed on the second USIM card according to the base station parameter information of the second base station. The base station parameter information of a resident base station selected by the first USIM card is provided as a data reference for cell reselection performed on the second USIM card, so as to avoid the situation where the second USIM card may still need to perform searching when subjected to cell reselection. By means of this method, the time consumed for performing cell reselection on the second USIM card can be shortened, and the occupation of network resources caused by performing cell reselection on the second USIM card can be avoided.

In an embodiment, the reason why the first USIM card is subjected to cell reselection is that the signaling of interaction between the terminal device and the base station is abnormal or the data quality of interaction between the terminal device and the base station is unsatisfactory. In the case where a service is triggered in the terminal device, the terminal device initiates a Radio Resource Control (RRC) resource connection to establish a process of interaction between the terminal device and the base station and a process of interaction between the terminal device and a core network. When the interaction between the terminal device and the base station is abnormal, that is, a current service cannot be completed because the current base station is too crowded or interfered by signals, the USIM card registered to the base station may be subjected to cell reselection. Alternatively, in the case where a service is triggered in the terminal device and the terminal device can normally interact with the base station, cell reselection is performed when any of the following conditions is monitored: substandard data throughput; or extremely low signal-to-noise ratio due to large signal interference and high bit error rate. The reason for triggering cell reselection is not specifically limited in this embodiment.

In an embodiment, in the case where the signaling of interaction between the terminal device and the base station is abnormal or the data quality of interaction between the terminal device and the base station is unsatisfactory, the terminal device controls the USIM card to reconnect to the base station and initiate a service for several times, and controls the USIM card to perform cell reselection if data transmission fails to be performed normally every time. The original base station is reconnected for several times before cell reselection is performed, to determine that the base station cannot be used, so that the occupation of network resources caused by performing cell reselection on the USIM card can be avoided.

In an embodiment, the present disclosure provides a cell reselection method, which is applied to the 5G technology (5th generation mobile networks). In addition, the cell reselection method can also be applied to the 4G technology (the 4th generation mobile communication technology), and the scope of use of the cell reselection method is not limited in this embodiment.

Figure 3:
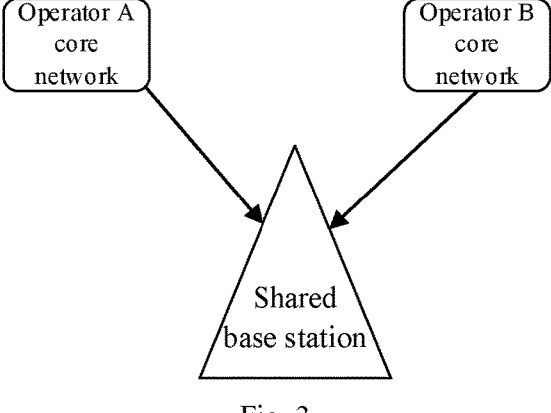
FIG. 3 is a schematic scenario diagram of a network architecture provided by an embodiment of the present disclosure.
Figure 4:
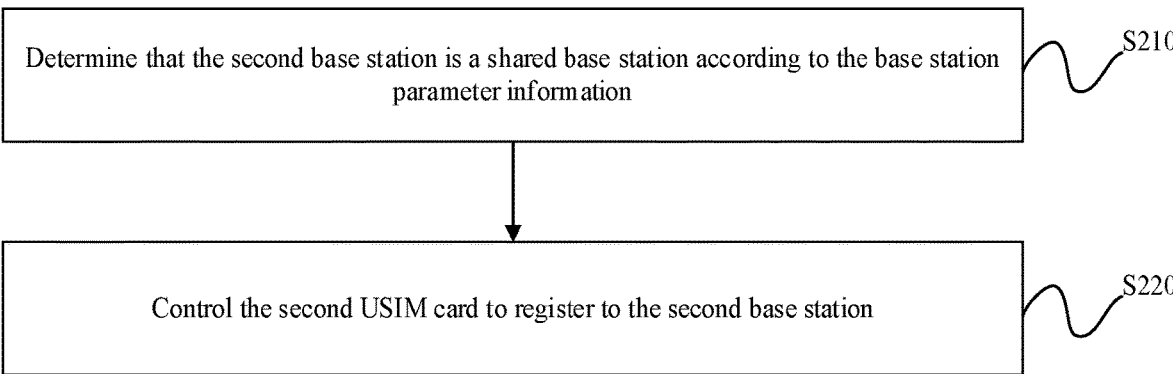
FIG. 4 is a flowchart of a reselection method when a first Universal Subscriber Identity Module (USIM) card and a second USIM card belong to different operators, provided by an embodiment of the present disclosure.

In addition, in an embodiment, as shown in FIG. 3 and FIG. 4, where FIG. 3 is a schematic scenario diagram of a network architecture provided by an embodiment of the present disclosure; and FIG. 4 is a flowchart of a reselection method when a first USIM card and a second USIM card belong to different operators, which is provided by an embodiment of the present disclosure, S120 further includes, but not limited to, following steps of S210 and S220.

At S210, it is determined that the second base station is a shared base station according to the base station parameter information.

At S220, the second USIM card is controlled to register to the second base station.

In an embodiment, in the case where the first USIM card and the second USIM card installed in the same terminal device do not belong to the same operator and are registered to the same shared base station, for the terminal device, the wireless parameters (for example, signal strength and signal measurement parameters) corresponding to the first USIM card and the second USIM card are identical. Therefore, network quality evaluation is only required to be performed on a network to which the first USIM card is registered, and the evaluation result can be directly adopted by the second USIM card. In this way, the time consumed for performing cell reselection on the second USIM card can be shortened, and the occupation of network resources caused by performing cell reselection on the second USIM card can be avoided.

In an embodiment, referring to FIG. 3, in the case where the first USIM card and the second USIM card do not belong to the same operator, when the first base station where the first USIM card resides is abnormal, the first USIM card is subjected to cell reselection and changes to the second base station by means of reselection, and the base station parameter information of the second base station is acquired. It is then determined whether the second base station is a shared base station according to the base station parameter information. If the second base station is a shared base station, the second USIM card is controlled to select the second base station as a resident base station. In this way, it is not necessary for the second USIM card to retrieve the details of all base stations again. Thus, the time consumed for performing cell reselection can be shortened, and the occupation of network resources can be reduced.

In an embodiment, after both the first USIM card and the second USIM card are subjected to cell reselection and change from the first base station to the second base station by means of reselection, when the second base station is abnormal after a certain time interval, the USIM card may be subjected to cell reselection, and in this case, the first base station will be taken as a detection target of cell reselection. The time interval is not specifically limited in this embodiment.

Figure 5:
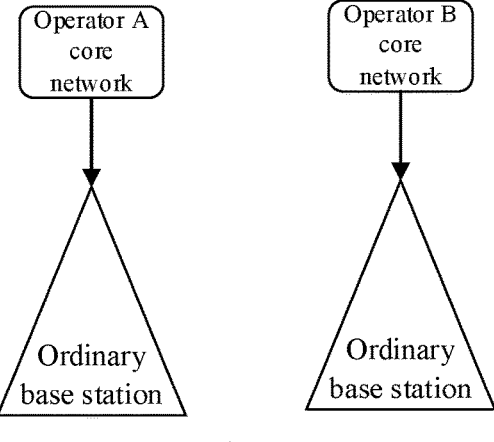
FIG. 5 is a schematic scenario diagram of a network architecture provided by an embodiment of the present disclosure.
Figure 6:
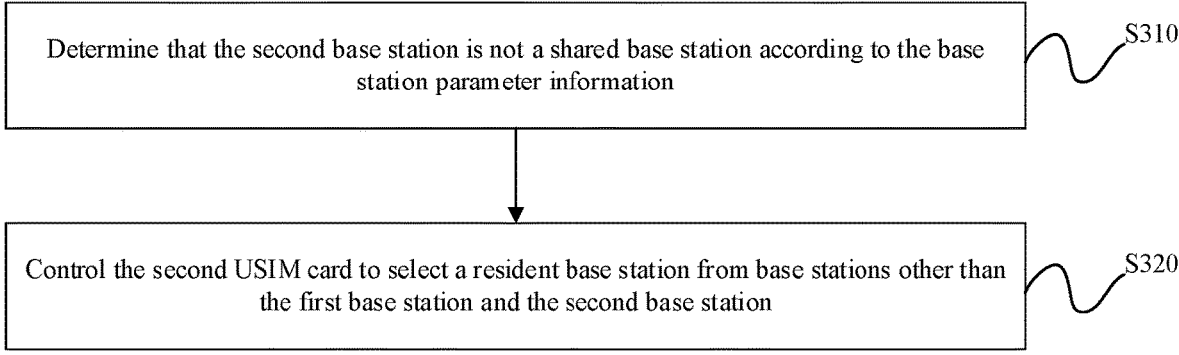
FIG. 6 is a flowchart of a reselection method when a first USIM card and a second USIM card belong to different operators, provided by an embodiment of the present disclosure.

In addition, in an embodiment, as shown in FIG. 5 and FIG. 6, where FIG. 5 is a schematic scenario diagram of a network architecture provided by an embodiment of the present disclosure; and FIG. 6 is a flowchart of a reselection method when a first USIM card and a second USIM card belong to different operators, which is provided by an embodiment of the present disclosure, S120 further includes, but not limited to, following steps of S310 and S320.

At S310, it is determined that the second base station is not a shared base station according to the base station parameter information.

At S320, the second USIM card is controlled to select a resident base station from base stations other than the first base station and the second base station.

In an embodiment, referring to FIG. 5, it can be understood that in the case where the first USIM card and the second USIM card installed in the same terminal device do not belong to the same operator, when the first base station where the first USIM card resides is abnormal, the first USIM card is subjected to cell reselection and changes to the second base station by means of reselection, and the base station parameter information of the second base station is acquired. It is then determined whether the second base station is a shared base station according to the base station parameter information. If the second base station is not a shared base station, the second USIM card cannot select the second base station as a resident base station. Therefore, the second USIM card is controlled to select a resident base station from base stations other than the first base station and the second base station. When the first USIM card and the second USIM card do not belong to the same operator, the base station parameter information provided by the first USIM card can exclude, for the second USIM card, the base stations to which the second USIM card cannot be registered, thus shortening the time required for performing cell reselection on the second USIM card.

In addition, in an embodiment, referring to FIG. 7 and FIG. 8, where FIG. 7 is a schematic scenario diagram of a network architecture provided by an embodiment of the present disclosure; and FIG. 8 is a flowchart of a reselection method when a first USIM card and a second USIM card belong to the same operator, which is provided by an embodiment of the present disclosure, S120 further includes, but not limited to, a following step of S410.

At S410, the second USIM card is registered to the second base station according to the base station parameter information.

In an embodiment, referring to FIG. 7, when the first USIM card and the second USIM card installed in the same terminal device belong to the same operator, the first USIM card and the second USIM card can select to reside in the same base station. It can be understood that when the first base station where the first USIM card resides is abnormal, the first USIM card is subjected to cell reselection and changes to the second base station by means of reselection, and the base station parameter information of the second base station is acquired. Because the first USIM card and the second USIM card belong to the same operator, the second USIM card is controlled to directly register to the second base station. Data provided by the first USIM card is taken as a reference for the second USIM card when the second USIM card is subjected to cell reselection, and it is not required to retrieve the details of all base stations again. Therefore, the time consumed for performing cell reselection on the second USIM card can be shorten, and the occupation of network resources caused by performing cell reselection on the second USIM card can be avoided.

In order to clearly illustrate the step processes of the information processing methods in the various embodiments, specific examples are given below.

Example One

FIG. 9 is a flowchart of a cell reselection method provided by an example of the present disclosure. As shown in FIG. 9, example one is applied to the case where a first USIM card and a second USIM card installed in a terminal device do not belong to the same operator and are connected to a first base station. The process includes the following steps of S510, S520, S530, S540 and S550.

At S510, the terminal device detects that the first base station is abnormal.

At S520, the first USIM card and the second USIM card are controlled to detect other base stations.

At S530, the first USIM card first finds an available second base station and changes to the second base station by means of reselection.

At S540, it is determined that the second base station is a shared base station, and base station parameter information of the second base station is acquired.

At S550, the second USIM card is controlled to register to the second base station.

Example Two

FIG. 10 is a flowchart of a cell reselection method provided by another example of the present disclosure. As shown in FIG. 10, example two is applied to the case where a first USIM card and a second USIM card installed in a terminal device do not belong to the same operator and are connected to a first base station. The process includes the following steps of S610, S620, S630, S640 and S650.

At S610, the terminal device detects that the first base station is abnormal.

At S620, the first USIM card and the second USIM card are controlled to detect other base stations.

At S630, the first USIM card first finds an available second base station and changes to the second base station by means of reselection.

At S640, it is determined that the second base station is not a shared base station, and base station parameter information of the second base station is acquired.

At S650, the second USIM card is controlled to select a resident base station from base stations other than the first base station and the second base station.

Example Three

FIG. 11 is a flowchart of a cell reselection method provided by another example of the present disclosure. As shown in FIG. 11, example three is applied to the case where a first USIM card and a second USIM card installed in a terminal device belong to the same operator and are connected to a first base station. The process includes the following steps S710, S720, S730, S740 and S750.

At S710, the terminal device detects that the first base station is abnormal.

At S720, the first USIM card and the second USIM card are controlled to detect other base stations.

At S730, the first USIM card first finds an available second base station and changes to the second base station by means of reselection.

At S740, base station parameter information of the second base station is acquired.

At S750, the second USIM card is controlled to register to the second base station.

Figure 12:
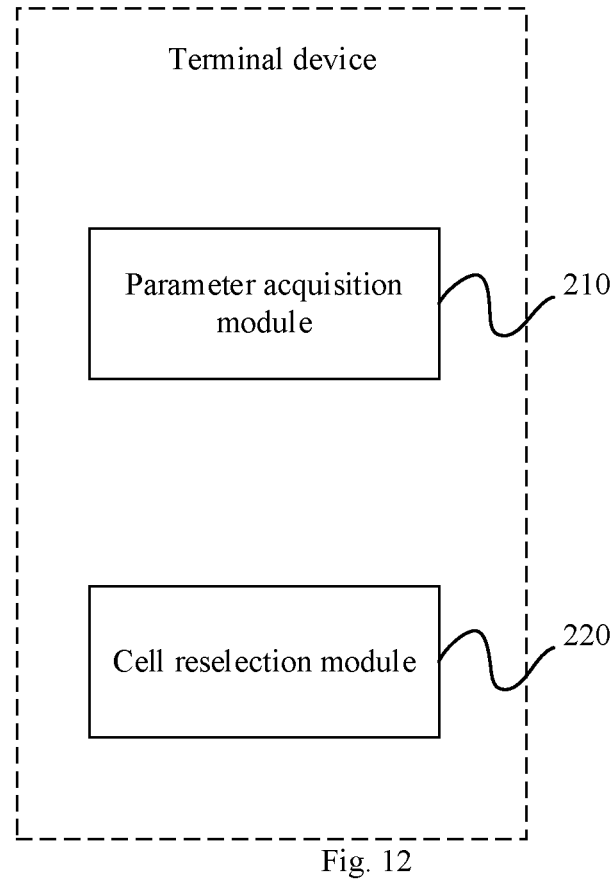
FIG. 12 is a schematic block diagram of a terminal device provided by an embodiment of the present disclosure.

In addition, an embodiment of the present disclosure further provides a terminal device. Referring to FIG. 12, the terminal device includes a parameter acquisition module 210 and a cell reselection module 220.

In an embodiment, the parameter acquisition module 210 is configured to acquire base station parameter information of a base station to which a USIM card is connected. For example, in the case where a first USIM card and a second USIM card are installed in the terminal device and are registered to a first base station, when the first USIM card is subjected to cell reselection and changes from the first base station to a second base station by means of reselection, the parameter acquisition module 210 acquires base station parameter information of the second base station to provide reference information for cell reselection performed on the second USIM card. The cell reselection module 220 is configured to perform cell reselection on the USIM card when the base station where the USIM card resides is abnormal. The cell reselection module 220 can control the first USIM card and the second USIM card to perform cell reselection according to the operators to which the first USIM card and the second USIM card installed in the terminal device belong and the base stations to which the first USIM card and the second USIM card are registered.

It should be noted that the terminal device in this embodiment may perform the cell reselection method in the embodiment as shown in FIG. 2. That is, the terminal device in this embodiment and the cell reselection method in the embodiment as shown in FIG. 2 belong to the same inventive concept, so these embodiments have the same implementation principles and technical effects, which will not be repeated here.

Figure 13:
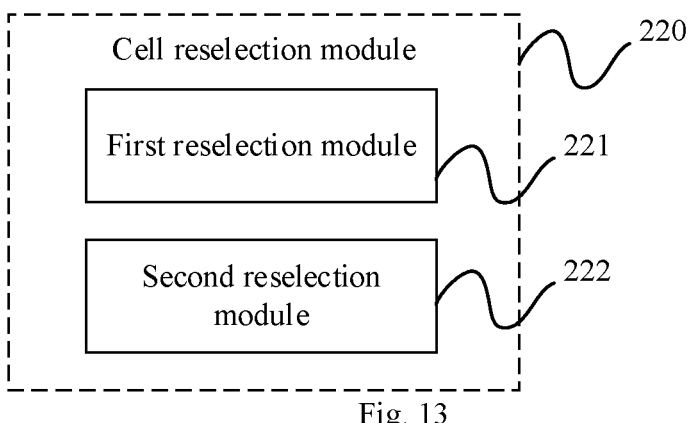
FIG. 13 is a schematic diagram of a cell reselection module in a terminal device provided by an embodiment of the present disclosure.

In addition, in an embodiment, referring to FIG. 13, the cell reselection module 220 includes a first reselection module 221 and a second reselection module 222.

In an embodiment, the first reselection module 221 is configured to register the second USIM card to the second base station in the case where the first USIM card and the second USIM card belong to different operators and it is determined that the second base station is a shared base station according to the base station parameter information. The first reselection module 221 is further configured to control the second USIM card to select a resident base station from base stations other than the first base station and the second base station in the case where the first USIM card and the second USIM card belong to different operators and it is determined that the second base station is not a shared base station according to the base station parameter information. The second reselection module 222 is configured to register the second USIM card to the second base station according to the base station parameter information in the case where the first USIM card and the second USIM card belong to the same operator.

It should be noted that the first reselection module 221 in this embodiment may perform steps S210 to S220 shown in FIG. 4 and steps S310 to S320 shown in FIG. 6, while the second reselection module 222 may perform S410 shown in FIG. 8. That is, the first reselection module 221 in this embodiment and steps S210 to S220 in the embodiment shown in FIG. 4 and steps S310 to S320 shown in FIG. 6, as well as the second reselection module 222 and S410 shown in FIG. 8, belong to the same inventive concept, so these embodiments have the same implementation principles and technical effects, which will not be repeated here.

In addition, another embodiment of the present disclosure further provides a terminal device. The terminal device includes a memory, a processor and a computer program stored in the memory and executable by the processor.

The processor and the memory may be connected by a bus or in other manners.

As a non-transient computer readable storage medium, the memory may be configured to store non-transient software programs and non-transient computer executable programs. In addition, the memory may include a high-speed random access memory, and may also include a non-transient memory, such as at least one magnetic disk storage device, a flash memory device, or other non-transient solid state storage device. In some implementations, the memory may include memories remotely located with respect to the processor, and these remote memories may be connected to the processor through networks. Examples of the above networks include, but are not limited to, the Internet, an intranet, a local area network, a mobile communication network and combinations thereof.

It should be noted that the terminal device in this embodiment may include the system architecture in the embodiment as shown in FIG. 1. The terminal device in this embodiment and the system architecture in the embodiment as shown in FIG. 1 belong to the same inventive concept, so these embodiments have the same implementation principles and technical effects, which will not be repeated here.

The non-transient software program and instructions required to perform the cell reselection method in the above embodiment are stored in the memory which, when executed by the processor, cause the processor to perform the cell reselection method in the above embodiment, for example, perform the above-described method steps S110 to S120 in FIG. 2, S210 to S220 in FIG. 4, S310 to S320 in FIG. 6, S410 in FIG. 8, S510 to S550 in FIG. 9, S610 to S650 in FIG. 10 and S710 to S750 in FIG. 11.

The device embodiments described above are merely illustrative, and the units described as separate components may or may not be physically separated, that is, they may be located in one place, or may be distributed onto multiple network elements. Some or all of the modules may be selected according to actual needs to achieve the purpose of this embodiment.

In addition, an embodiment of the present disclosure further provides a computer-readable storage medium storing a computer-executable instruction which, when executed by a processor or controller, for example, by a processor in the terminal device embodiment described above, causes the processor to perform the cell reselection method in the above embodiment, for example, perform the above-described method steps S110 to S120 in FIG. 2, S210 to S220 in FIG. 4, S310 to S320 in FIG. 6, S410 in FIG. 8, S510 to S550 in FIG. 9, S610 to S650 in FIG. 10 and S710 to S750 in FIG. 11

In an embodiment of the present disclosure, a first USIM card and a second USIM card are installed in a terminal device, and are registered to a first base station, and the terminal device acquires base station parameter information of a second base station in the case where the first USIM card is subjected to cell reselection and changes from the first base station to the second base station by means of reselection, and performs cell reselection on the second USIM card according to the base station parameter information. According to the scheme provided by embodiment of the present disclosure, after the first USIM card is subjected to cell reselection and changes from the first base station to the second base station by means of reselection, base station parameter information of the second base station is acquired, and cell reselection performed on the second USIM card is completed according to the base station parameter information of the second base station. That is, the base station parameter information of the reselected base station obtained by performing cell reselection on the first USIM card is provided as a data reference for cell reselection performed on the second USIM card. Therefore, the time consumed for performing cell reselection on the second USIM card can be shortened, and the occupation of network resources caused by cell reselection performed on the second USIM card can be avoided.

Those having ordinary skills in the art can understand that all or some of the steps, and systems in the method disclosed above may be implemented as software, firmware, hardware and appropriate combinations thereof. Some or all of the physical components may be implemented as software executed by a processor, such as a central processing unit, a digital signal processor or a microprocessor, or as hardware, or as an integrated circuit, such as an application specific integrated circuit. Such software may be distributed on a computer-readable medium, and the computer-readable medium may include a computer storage medium (or a non-transitory medium) and a communication medium (or a transitory medium). As is well known to those having ordinary skills in the art, the term computer storage medium includes volatile and nonvolatile, removable and non-removable media implemented in any method or technology for storing information such as computer readable instructions, data structures, program modules or other data. A computer storage medium may include RAM, ROM, EEPROM, flash memory or other memory technologies, CD-ROM, digital versatile disk (DVD) or other optical disk storage, magnetic cassette, magnetic tape, magnetic disk storage or other magnetic storage devices, or any other media that can be used to store desired information and can be accessed by a computer. In addition, it is well known to those having ordinary skills in the art that the communication medium may generally include computer readable instructions, data structures, program modules or other data in a modulated data signal such as a carrier wave or other transmission mechanism, and may include any information delivery medium.

The above is a detailed description of some embodiments of the present disclosure, but the present disclosure is not limited to the above embodiments. Those having ordinary skills in the art can also make various equivalent modifications or substitutions without violating the scope of the present disclosure, and these equivalent modifications or substitutions are included in the scope defined by the claims of the present disclosure.

What is claimed is:

1. A cell reselection method, applied to a terminal device, wherein a first Universal Subscriber Identity Module (USIM) card and a second USIM card are installed in the terminal device, and are registered to a first base station, the method comprising:

acquiring base station parameter information of a second base station in response to the first USIM card being subjected to cell reselection and changing from the first base station to the second base station by means of reselection; and performing cell reselection on the second USIM card according to the base station parameter information;

wherein in response to the first USIM card and the second USIM card belonging to different operators, performing cell reselection on the second USIM card according to the base station parameter information comprises:

in response to determining that the second base station is a shared base station according to the base station parameter information, registering the second USIM card to the second base station according to the base station parameter information.

2. The cell reselection method of claim 1, wherein performing cell reselection on the second USIM card according to the base station parameter information further comprises:

in response to determining that the second base station is not a shared base station according to the base station parameter information, controlling the second USIM card to select a resident base station from base stations other than the first base station and the second base station.

3. A terminal device, comprising: a memory, a processor, and a computer program stored in the memory and executable by the processor which, when executed by the processor, causes the processor to perform a cell reselection method, applied to a terminal device, wherein a first Universal Subscriber Identity Module (USIM) card and a second USIM card are installed in the terminal device, and are registered to a first base station, the method comprising:

acquiring base station parameter information of a second base station in response to the first USIM card being subjected to cell reselection and changing from the first base station to the second base station by means of reselection; and performing cell reselection on the second USIM card according to the base station parameter information;

wherein in response to the first USIM card and the second USIM card belonging to different operators, performing cell reselection on the second USIM card according to the base station parameter information comprises:

in response to determining that the second base station is a shared base station according to the base station parameter information, registering the second USIM card to the second base station according to the base station parameter information.

4. The terminal device of claim 3, wherein performing cell reselection on the second USIM card according to the base station parameter information further comprises:

in response to determining that the second base station is not a shared base station according to the base station parameter information, controlling the second USIM card to select a resident base station from base stations other than the first base station and the second base station.

5. A non-transitory computer-readable storage medium, storing a computer-executable instruction which, when executed by a processor, causes the processor to perform a cell reselection method, applied to a terminal device, wherein a first Universal Subscriber Identity Module (USIM) card and a second USIM card are installed in the terminal device, and are registered to a first base station, the method comprising:

acquiring base station parameter information of a second base station in response to the first USIM card being subjected to cell reselection and changing from the first base station to the second base station by means of reselection; and performing cell reselection on the second USIM card according to the base station parameter information;

wherein in response to the first USIM card and the second USIM card belonging to different operators, performing cell reselection on the second USIM card according to the base station parameter information comprises:

in response to determining that the second base station is a shared base station according to the base station parameter information, registering the second USIM card to the second base station according to the base station parameter information.

6. The non-transitory computer-readable storage medium of claim 5, wherein performing cell reselection on the second USIM card according to the base station parameter information further comprises:

in response to determining that the second base station is not a shared base station according to the base station parameter information, controlling the second USIM card to select a resident base station from base stations other than the first base station and the second base station.

* * * * *